US005858418A

United States Patent [19]

Buchy

[11] Patent Number: 5,858,418

[45] Date of Patent: Jan. 12, 1999

[54] MACHINE FOR REPROFILING CORRUGATED MATERIALS

[75] Inventor: Michel Buchy, Franqueville-St Pierre, France

[73] Assignee: Onduline, Paris, France

[21] Appl. No.: 968,429

[22] Filed: Nov. 12, 1997

[30] Foreign Application Priority Data

Nov. 12, 1996 [FR] France .................................. 96 13763

[51] Int. Cl.[6] .............................. B29C 4/48; B29C 53/28

[52] U.S. Cl. .......................... 425/336; 425/340; 425/369; 425/370; 425/396

[58] Field of Search .................................... 425/340, 369, 425/370, 394, 396, 344, 345, 352, 353, 354, 335, 336

[56] References Cited

U.S. PATENT DOCUMENTS

| | | | |
|---|---|---|---|
| 2,723,708 | 11/1955 | Tefft . | |
| 3,876,359 | 4/1975 | Herr | 425/370 |
| 3,986,808 | 10/1976 | Keith | 425/370 |
| 5,200,013 | 4/1993 | Traber | 425/396 |
| 5,531,585 | 7/1996 | Lapke | 425/370 |

FOREIGN PATENT DOCUMENTS

| | | |
|---|---|---|
| 0 338 826 | 10/1989 | European Pat. Off. . |
| 2162034 | 7/1973 | France . |
| 2183705 | 12/1973 | France . |
| 2 658 848 | 8/1991 | France . |
| 60-115332 | 6/1985 | Japan . |
| 662421 | 12/1951 | United Kingdom . |
| 2 036 823 | 7/1980 | United Kingdom . |

*Primary Examiner*—Patrick Ryan
*Attorney, Agent, or Firm*—Young & Thompson

[57] ABSTRACT

The invention consists of a machine for continuously reprofiling a corrugated material comprising:

support bars (7) for the corrugated material, driven in translation and perpendicular to their direction of displacement, reprofiling bars (2) fixed to an endless chain (11) rotatably driven and movable in translation with respect to said chain (11), counter-forming bars (6) fixed to another endless chain (16), also rotatably driven, and movable in translation with respect to said chain (16), the profile of the counter-forming bars being complementary to that of the reprofiling bars, the reprofiling bars (2) and counter-forming bars (6) being positioned on either side of the plane of the support bars (7) in such a way that parts of said bars are opposite one another and the translation movements of the reprofiling and counter-forming bars opposite one another are made approximately perpendicular to the plane of the support bars.

8 Claims, 4 Drawing Sheets

MACHINE FOR REPROFILING CORRUGATED MATERIALS

FIELD OF THE INVENTION

This invention relates to a machine for reprofiling corrugated covering materials.

BACKGROUND OF THE INVENTION

The corrugated materials are notably produced based on a fibrous material, impregnated with bitumen and coated or painted.

They are notably used to produce under-roofs for roofs made with arched tiles or flat tiles with a tenon.

The arched tiles can be directly positioned on the corrugations, the shape of which provides their fixing.

This is not the case for the flat tiles. It is advisable to fix battens previously onto the under-roof, onto which the flat tiles will afterwards be laid.

The presence of battens weakens the under-roof which has a tendency to deform, the weight of the battens and the tiles being almost entirely supported by the summits of the corrugations.

That is why support members and load distribution members are often placed between the battens and the under-roof. Such members are notably described in FR Pat. 2 658 848.

The battens and the support and load distribution members have a not insignificant effect on the cost of roofs. Furthermore, they can, in part, block the passage of air between the tiles and the under-roof.

It has therefore appeared necessary to design a machine that allows previously corrugated materials to be reprofiled, in such a way that they comprise prints that allow the tiles with tenons to be fixed directly onto the corrugated material.

SUMMARY OF THE INVENTION

Hence the invention relates to a machine for continuously reprofiling a corrugated material comprising:

support bars for the corrugated material, driven in translation and perpendicular to their direction of displacement, reprofiling bars fixed to an endless chain rotatably driven and movable in translation with respect to said chain, counter-forming bars fixed to another endless chain, also rotatably driven, and movable in translation with respect to said chain, the profile of the counter-forming bars being complementary to that of the reprofiling bars, the reprofiling bars and the counter-forming bars being positioned on either side of the plane of the support bars in such a way that parts of said bars are opposite one another and the translation movements of the reprofiling bars and counter-forming bars opposite one another are made approximately perpendicular to the plane of the support bars.

The materials reprofiled by this machine allow under-roofs to be produced, without battens, or support and load distribution members.

The following characteristics of the invention can also be taken into consideration, in accordance with any combination that is technically possible:

the reprofiling bars and counter-forming bars are fixed orthogonally to their respective endless chains, said chains being in part parallel to one other and to the plane of the support bars.

the support bars are the bars of the dryer chain, the machine comprises means to mechanically control the movement in translation of the reprofiling bars and the counter-forming bars, said means comprise a slide and possibly a cam, each chain is rotatably driven by shafts situated in a plane parallel to that of the support bars, the machine comprises means for maintaining the reprofiling bars and the counter-forming bars in contact, the counter-forming bars assembly is mounted so as to be movable with respect to the plane of the support bars.

BRIEF DESCRIPTION OF THE DRAWINGS

The invention will be better understood and other aims, advantages and characteristics of it will be more clearly apparent on reading the description that follows and which is made in relation to the appended drawings, representing non-limitative examples of embodiments of the invention and in which.

DETAILED DESCRIPTION OF THE PREFERRED EMBODIMENT

The elements common to the different Figures will be designated by the same reference numbers.

Figure 1:
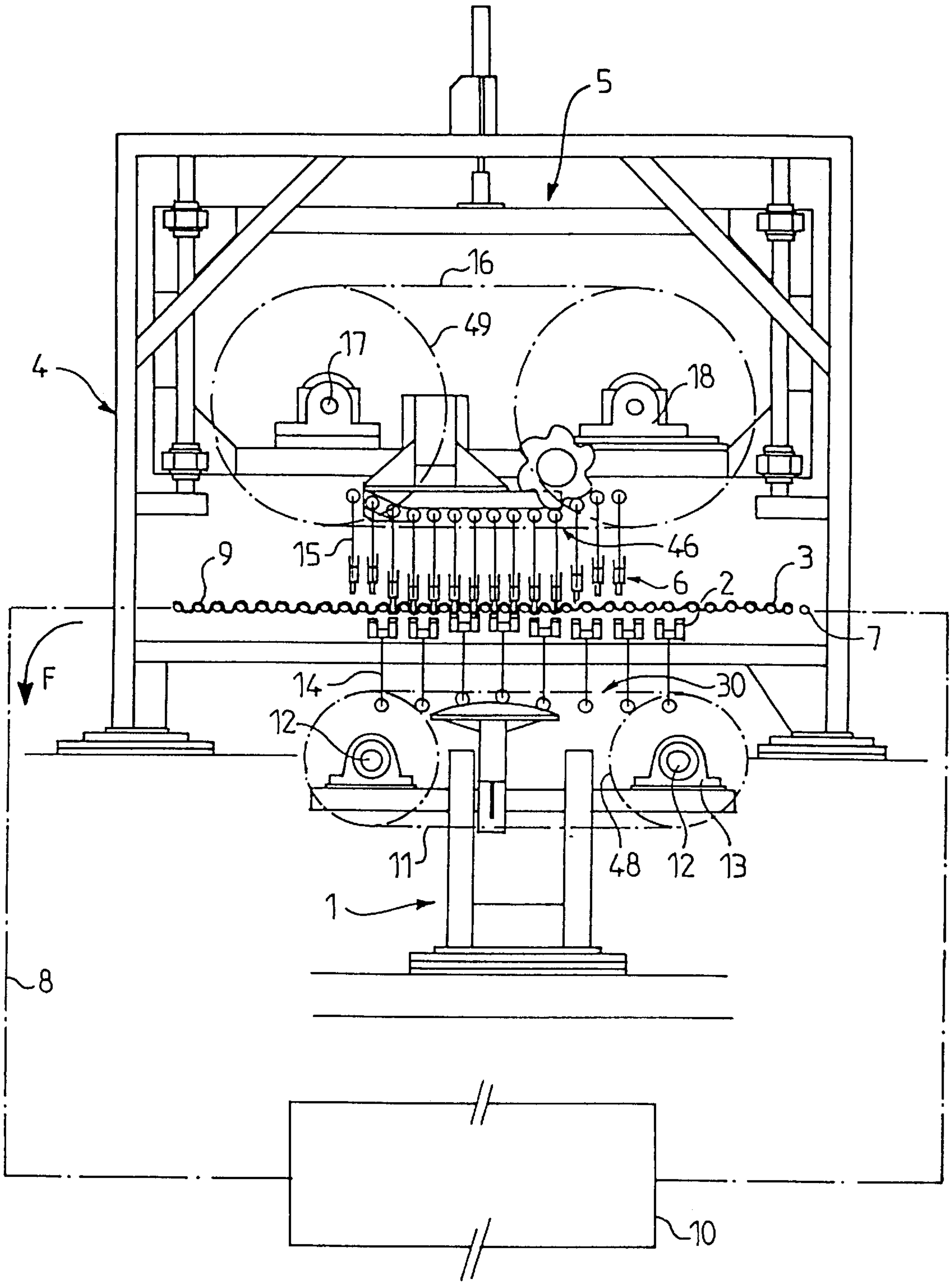
FIG. 1 is a diagrammatic view of an assembly of an embodiment example of the machine according to the invention, illustrating its operation.

Referring to FIG. 1, the machine according to the invention comprises a first frame 1 supporting bars 2 used as formers to reprofile a material previously corrugated 3.

The machine also comprises a second frame 4, on which a block 5 is mounted that supports bars 6 used as counter-formers.

The block 5 is slidably mounted on slides fixed to the frame 4. This allows adjustment of the distance between the reprofiling bars 2 and the counter-forming bars 6.

The material 3 has been previously corrugated by any type of machine, this machine not being represented in FIG. 1. The profile of the corrugations is also of any kind.

The material is generally made up of wet cardboard, felt or any other malleable material.

The material is brought onto the support bars 7 by a device not shown on the Figure. The bars are, preferably, those of the dryer chain 8.

This solution has the advantage of avoiding the handling of materials 9 which come out of the reprofiling machine wet, before they go into the dryer tunnel 10.

This limits the risk of damaging the product and reduces handling costs.

The materials are removed from the support bars 7, when they leave the dryer 10. The direction of circulation of the materials 9 on the dryer chain 8 is shown by the arrow F.

In a general way, each reprofiling bar 2 is fixed, by means of a support 14, onto an endless chain 11, rotatably driven by two parallel shafts 12 by means of transmission units 48.

The shafts are mounted in bearings 13 fixed to the frame 1.

The reprofiling bars 2 are parallel to the shafts 12. The supports 14 are, in the example shown, perpendicular to the chain 11 and movable in translation with respect to this chain.

Similarly, the counter-forming bars are fixed, by means of a support 15, onto an endless chain 16, rotatably driven by two parallel shafts 17, by means of transmission units 49.

The shafts 17 are mounted in bearings 18 fixed to the frame 1. The counter-forming bars 6 are parallel to the shafts 18. The supports 15 are, in the example shown, perpendicular to the chain 16 and movable in translation with respect to this chain.

The reprofiling and counter-forming bars are, furthermore, parallel to the bars 7 of the dryer.

Figure 2:
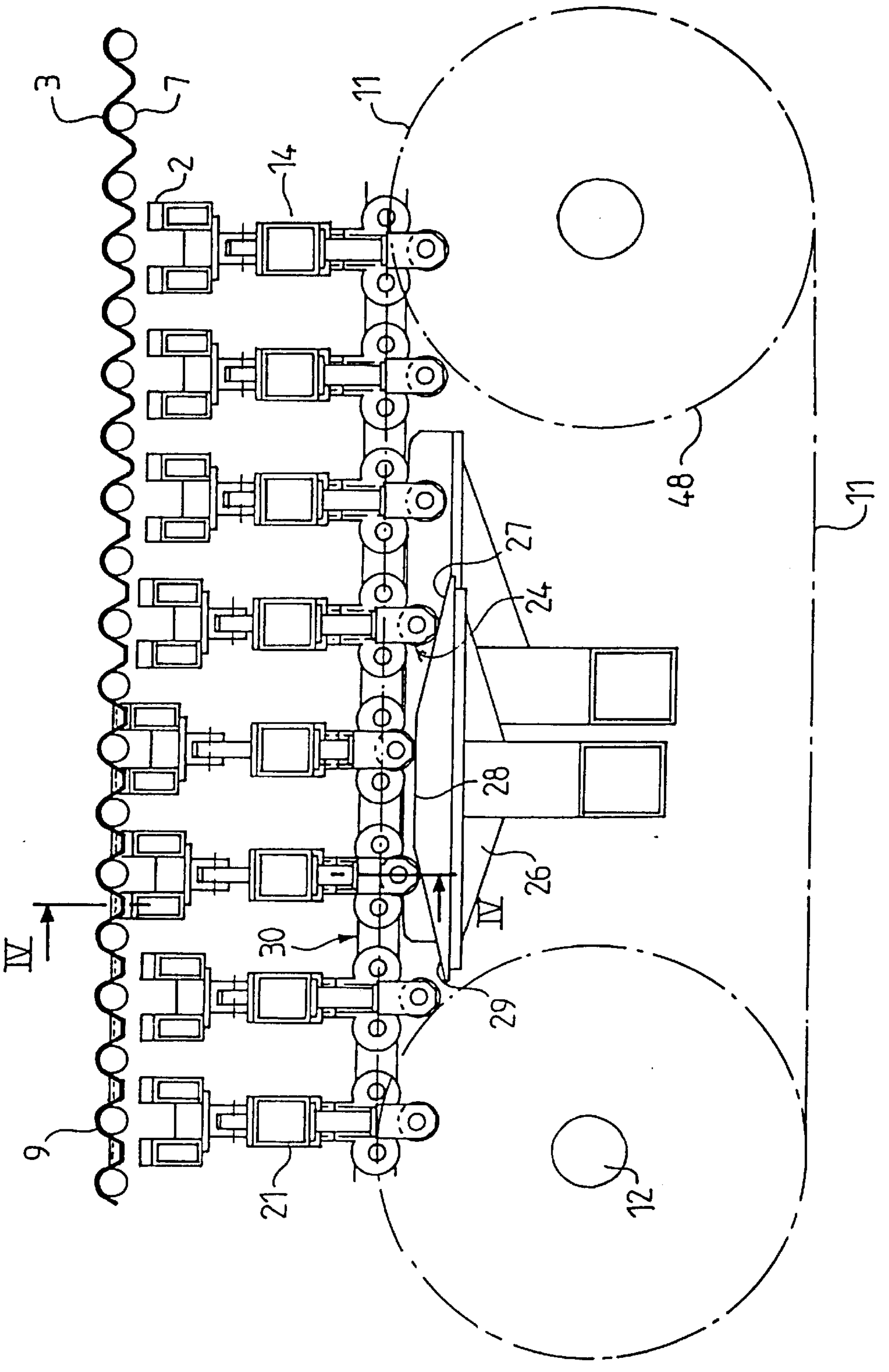
FIG. 2 is a partial view, in section of an embodiment example of a machine according to the invention, along a plane perpendicular to the corrugations of the material, illustrating in detail a first part of the machine.

Referring now to FIG. 2, the sheet 3 of corrugated material is supported by the bars 7 of the dryer. The material 9 which comes out of the reprofiling machine has a profile that corresponds to that of the reprofiling bars 7 and the counter-forming bars 6.

The material formed by the machine illustrated in FIGS. 2 and 3 will be described more precisely in reference to FIG. 6.

In the example illustrated in FIG. 2, the reprofiling bars 2 are fixed two by two on the endless chain 1, by means of a support 14. This allows production ol the machine to be simplified.

The section of the reprofiling bars is substantially rectangular.

Figure 4:
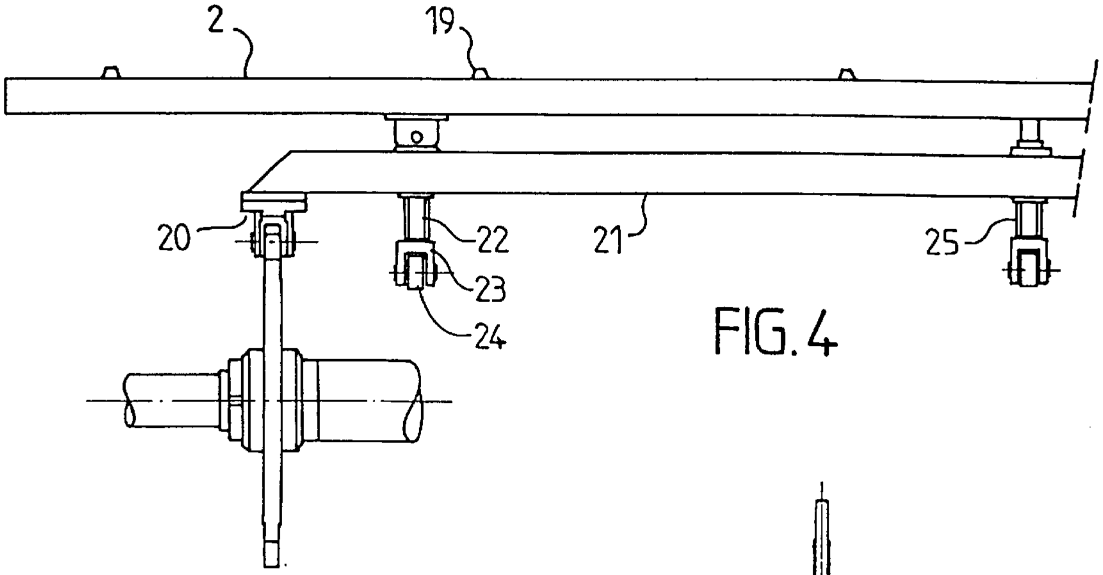
FIG. 4 is a partial view in section along IV—IV in FIG. 2.

As FIG. 4 shows, each bar 2 also comprises members 19 that protrude.

FIG. 4 illustrates in a more precise way how the reprofiling bars 2 are connected to the endless chain 11.

In order to be able to reprofile corrugated materials of relatively large size, the reproliling bars are relatively long. This is why the endless chain 11 is, preferably, made up of two members 20, linked by support bars 21.

The support 14 of each reprofiling bar 2 comprises at least one member 22 movable in translation with respect to the support bar 21. Depending on the length of the reprofiling bar 2, several members 22 may be provide. The machine illustrated in FIG. 4 comprises three of them for each bar 21.

On the side opposite to the reprofiling bar 2, a clevis 23 carrying running gear 24 is fixed onto member 22.

Between the support bar 21 and the clevis 23, elastic means 25 are provided, Such as a spring.

Reterring once again to FIG. 2, the corrugating machine also comprises a slide 26 which is fixed to the first frame 1. It comprises a first part 27 that is askew, going away from the plane of the shafts 12, a second part 28 parallel to this plane and a third part 29 that is askew getting closer to this plane.

The operation is the following, as regards the first part of the machine that comprises the reprofiling bars:

The previously corrugated material 3 continuously moves past on the bars 7 of the dryer.

The reprofiling bars 2 are brought by the endless chain into the part 30 of the chain where they are opposite the bars 7 of the dryer, the part 30 then being parallel to the plane of these bars. The support 14 of these bars is then perpendicular to the plane of the bars of the dryer and the reprofiling bars are in the lower position.

Then, a reprofiling bar arrives opposite the slide 26. Its running gear 24 comes into contact firstly with the first part 27 of the slide. This causes translation of the corresponding movable member 22, towards the plane of the dryer bars 7.

When the running gear 24 arrives on the second part 28 of the slide, the member 22 and the reprofiling bar 2 are in the high position. In this position, the reprofiling bar comes into contact with the profiled material. This contact is maintained as long as the running gear 24 is on the second part 28 of the slide.

In this position, the reprofiling bar modifies the profile of the corrugated material. In the example illustrated in FIG. 2, the summit of the corrugations is flattened and embossings are formed in the corrugations.

The running gear 24 then comes into contact with the third part 29 of the slide. The pressure on the movable member 22 is released, and the spring 25, previously compressed, distends. The movable member 22 then makes a translation movement which moves it, like the reprofiling bar 2, away from the plane of the dryer bars 7.

In the example illustrated in FIG. 2, a part 30 of the chain 11 is parallel to the plane of the support bars 7 and the reprofiling bars 2 are fixed orthogonally to the chain. Other embodiments can be envisaged, in which the reprofiling bars are displaced, in translation, perpendicular to the plane of the support bars.

The reprofiling bars can only correctly modify the profile of the corrugations insofar as a counter-former is provided of the other side of the material to be corrugated.

This is the purpose of the second part of the machine which will be described more precisely having regard to FIGS. 3 and 5.

When the bars 6 are relatively long, as in the example illustrated in the Figures, the chain 16 is, preferably, made up of two elements 30, linked by support bars 31.

The counter-forming bars 6 are fixed to the endless chain by a support 15, which comprises: at least one movable member 32 passing through a guide device 33 fixed to the support bar 31 and a support system 34 for the bar 6, linked to the movable member 32 by suitable means 35.

The support system 34 is also necessary when the bar 6 is relatively long.

Figure 3:
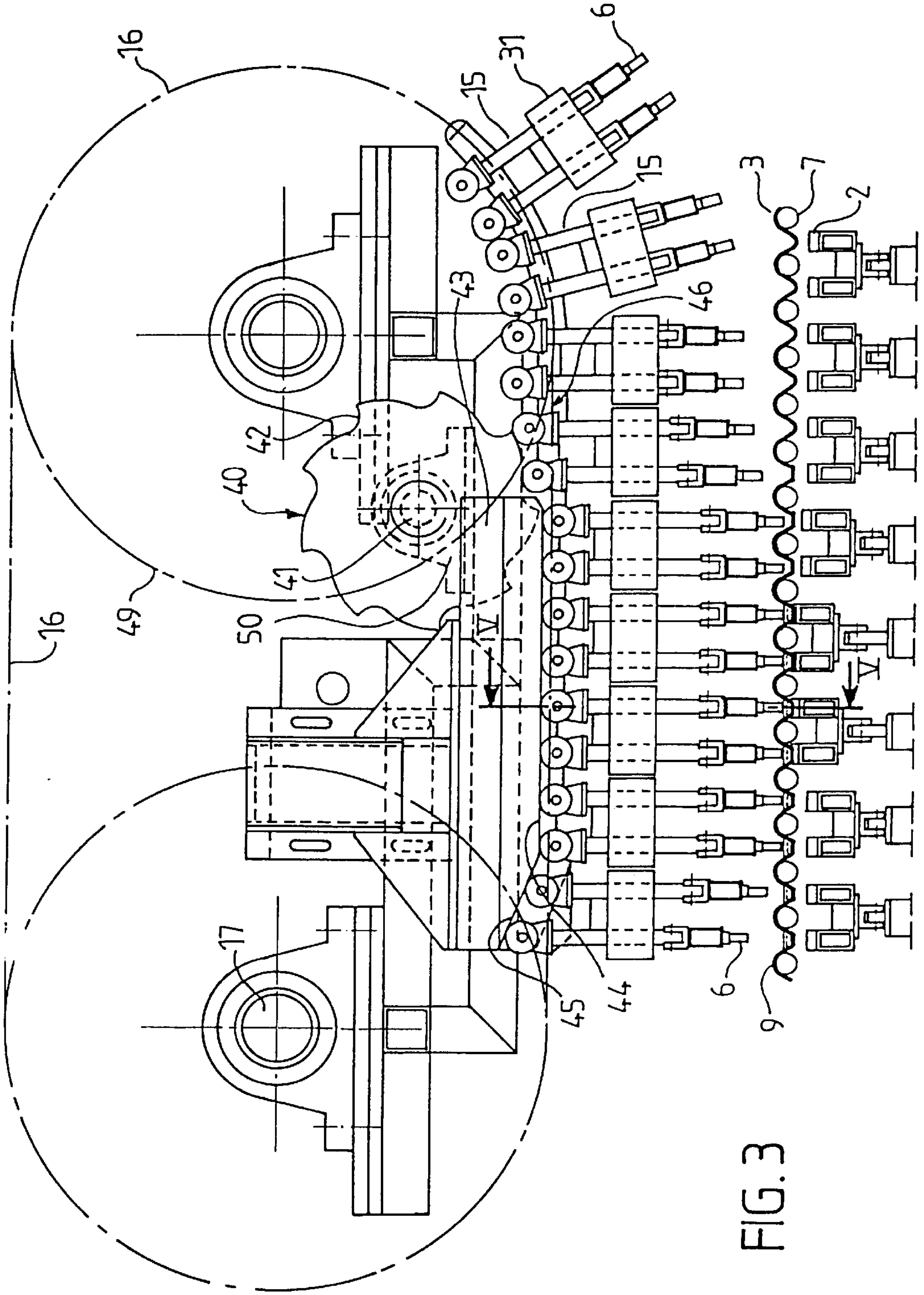
FIG. 3 is another partial view, in section, of an embodiment example of a machine according to the invention, along a plane perpendicular to the corrugations of the material, illustrating, in detail a second part of the machine.

In the example illustrated in FIG. 3, the support bar 31 is common to two counter-forming bars 6, in order to reduce the cost of manufacture of the machine.

On the opposite side of the counter-forming bar 6, a clevis 36 is fixed onto the movable member 32 that supports a member 37 between two bearings 38. The member 37 protrudes slightly with respect to the bearings.

The clevis 36 is linked to the guide device 33 by elastic means 39, such as a spring.

Hence, the movable member 32 is mobile in translation with respect to the support bar 31 and to the guide device 33 and perpendicular to them.

Figure 5:
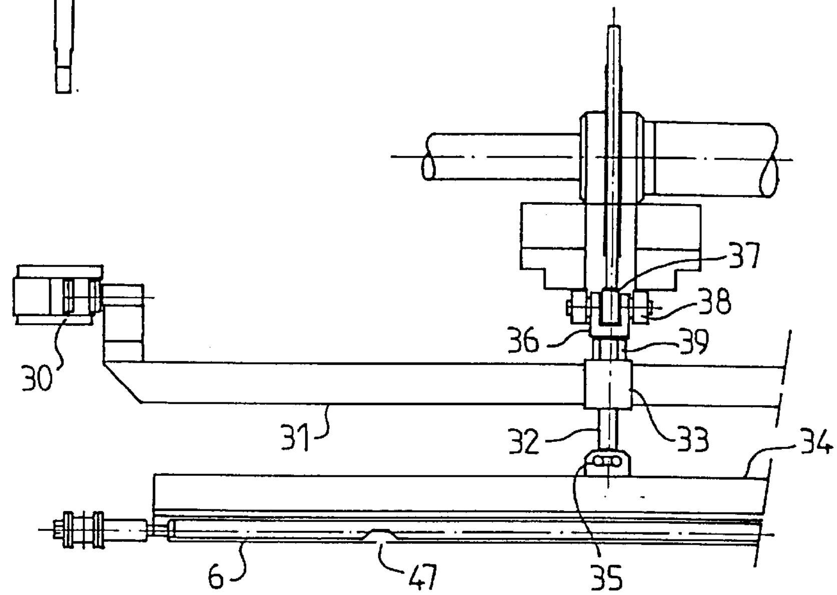
FIG. 5 is a partial view in section along V—V in FIG. 3

In the example represented in FIG. 5, the machine comprises two movable members 32.

The cross-section of the counter-forming bars is substantially rectangular. As FIG. 5 shows, each bar 6 comprises hollowed out parts 47, corresponding to the protruding elements 19 of the reprofiling bars 2. The reprofiling and counter-forming bars are fixed to the machine in such a way that the protruding elements 19 can go into the hollowed parts 47 when the bars are opposite one another.

Referring once again to FIG. 3, the corrugating machine also comprises at least one cam 40, rotatably driven by a shaft 41. This is rotatably mounted in a bearing 50 fixed to the block 5.

The cam 40 comprises a plurality of projections 42. As many cams are provided as elements 32 for a corrugating bar.

A slide 43 is also fixed in the block 5. This slide 43 comprises a first area 44 parallel to the plane of the dryer bars 7 and a second area 45 askew and going away from this plane. The machine comprises one slide associated with each cam.

The operation of the second part of the machine is as follows:

The counter-forming bars 6 are brought by the chain 16 into the part 46 of the chain where they are opposite the bars of the dryer, the part 46 being parallel to the plane of the dryer bars. The support 15 of the bars is then perpendicular to this plane.

The bars 6 are in the high position and are not in contact with the previously corrugated material 3.

Each counter-forming bar then arrives opposite a projection 42 of the cam 40, and this projection presses against the element 24 fixed to the movable member 32.

Because of the rotation of the cam, the projection 42 drives into the movable member 32, which causes the translation of the counter-forming bar 6, perpendicular to the plane of the dryer bars 7 and in the direction of this plane. The counter-forming bar 6 is then in the low position.

The elastic means 39 are then compressed and are in the position illustrated in FIG. 5.

While the counter-forming bar 6 is in the low position, the running gear 37 is in contact with the first part 44 of the slide, the bar being driven by the chain 16 in the direction that the corrugated material 3 is running.

Each counter-forming bar 6 is maintained in the low position as long as the running gear 37 is in contact with the first part of the slide which is parallel to the plane of the dryer bars 7.

Then, the running gear 37 is engaged in the second area 45 of the slide.

On leaving this second area 45, the counter-forming bar 6 is once again in the high position.

Any other embodiment of the second part of the machine may be provided, insofar as the translation movements of the counter-forming bars 6 are made perpendicular to the plane of the support bars, when the bars 6 are opposite the support bars.

The cam 40 is provided in the second part of the machine since the movement of the counter-forming bars is of greater amplitude than that of the reprofiling bars.

As described with reference to FIG. 2, it is in the part 30 of the chain 11 of reprofiling bars that is parallel to the plane of the dryer bars that the reprofiling bars are in the high position, in contact with the corrugated material 3.

The endless chains 11 and 16 are synchronised, in such a way that a counter-forming bar 6 is opposite a reprofiling bar 2, in the parts 30 and 46 of the chains 11 and 16 which are parallel to the plane of the dryer bars.

The distance between the reprofiling bars 2 in the high position and the counter-forming bars 6 in the low position is adjusted in such a way that the corrugated material 3 is gripped between a reprofiling bar and a counterforming bar. The counter-forming bars are positioned in the hollows of the corrugations of the material 3. The setting is provided by positioning the block 5 with respect to the frame 4 in an appropriate manner.

This allows the desired profile to be printed into the corrugated material.

Furthermore, the slides 26, respectively 43, thanks to their first parts 28, respectively 44, allow the reprofiling bars 2 to be held in the high position and respectively the counter-forming bars 6 to be held in the low position. The desired profile can then be formed in a stable fashion and the stresses in the material are reduced.

When the reprofiling bars 2 pass again into the low position and the counter-forming bars 6 return to the high position, they are disengaged from the material 9 which continues to run on the dryer bars 7.

The reprofiling and counter-forming bars, being movable in translation perpendicular to the plane of the bars 7 of the dryer, they can easily come into contact with the corrugated material and be retracted, whatever the shape and the amplitude of the corrugations of the material to be reprofiled.

Figure 6:
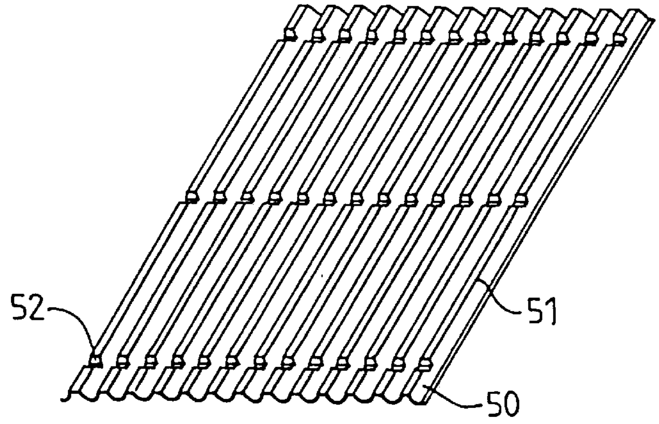
FIG. 6 is a perspective view of an example of material obtained with the machine according to the invention.

The material 9 obtained with the machine which has just been described is illustrated in FIG. 6.

It has regular corrugations 50, the summits of which 51 are flattened. The material therefore has a semi-trapezoidal profile.

In addition, on the convex part of each corrugation, the material 9 comprises hollowed areas 52 which are distributed, spaced apart from one another, along straight parallel lines perpendicular to the corrugations 50.

The flattening of the summits of the corrugations is obtained thanks to the reprofiling bars 2 and the counter-forming bars 6. The hollowed areas 52 are formed by the protruding elements 19 which go into the hollowed parts 47.

The material illustrated in FIG. 6 is more particularly intended for the making of under-roofs for flat tiles with a tenon. The distance between two hollowed areas is selected as a function of the space between the nose and the heel of the relevant flat tiles. Furthermore, the depth of the hollowed areas is selected in order to be able to receive and to maintain the tenons of these tiles.

The timber-work is firstly covered with sheets made of a material such as the one illustrated in FIG. 6, the corrugations being positioned along the slope of the roof.

The flat tiles are then directly laid on the under-roof thereby made, the hollowed areas receiving the tenons of the tiles.

Slippage of the tiles is avoided and battens are not required.

Furthermore, the semi-trapezoidal profile of the material 9 reinforces its strength and provides a large contact surface between the flat tiles and the corrugations.

The reprofiling machine according to the invention allows the production of materials other than that illustrated in FIG. 6. For this, it suffices to modify the reprofiling bars 2 as well as the corresponding counter-forming bars 6.

The corrugated material 3 may not comprise regular corrugations like that illustrated in the figures. It may, for example, have alternating corrugations and flat areas. In this case, it is necessary to modify the chains of the reprofiling bars and the counter-forming bars in order to match them to this material.

Finally, in the examples that have been described, the translation movement of the reprofiling bars and the counterforming bars is controlled mechanically. Another type of control, for example electrical, might also be envisaged.

I claim:

1. A machine for continuously reprofiling a corrugated material comprising:

support bars for the corrugated material, driven in translation and perpendicular to their direction of displacement, reprofiling bars fixed to an endless chain rotatably driven and movable in translation with respect to said chain, counter-forming bars fixed to another endless chain , also rotatably driven, and movable in translation with respect to said chain, the profile of the counter-forming bars being complementary to that of the reprofiling bars, the reprofiling bars and counter-forming bars being positioned on either side of the plane of the support bars in such a way that parts of said bars are opposite one another and the translation movements of the reprofiling and counter-forming bars opposite one another are made approximately perpendicular to the plane of the support bars.

2. A machine according to claim 1, wherein the reprofiling bars and the counter-forming bars are fixed orthogonally to their respective endless chains, said chains being in part parallel to one another and to the plane of the support bars.

3. A machine according to claim 1, wherein the support bars are the bars of the dryer chain.

4. A machine according to claim 1, comprising means to mechanically control the movement in translation of the reprofiling bars and the counter-forming bars.

5. A machine according to claim 4, said means comprising a slide and possibly a cam.

6. A machine according to claim 2, wherein each chain is rotatably driven by shafts provided in a plane parallel to that of the support bars.

7. A machine according to claim 1, comprising means for maintaining the reprofiling bars and the counter-forming bars in contact.

8. A machine according to claim 1, wherein the assembly of counter-forming bars is movably mounted with respect to the plane of the support bars.

* * * * *